T. Hansbrow
Pump Lift
N°. 40,927. Patented Dec. 15, 1863.

Witnesses
J. W. Coombs
Geo. W. Rees

Inventor
Thomas Hansbrow
per Munn & Co.
Attorneys

UNITED STATES PATENT OFFICE.

THOMAS HANSBROW, OF SACRAMENTO, CALIFORNIA.

IMPROVEMENT IN PUMPS.

Specification forming part of Letters Patent No. 40,927, dated December 15, 1863.

*To all whom it may concern:*

Be it known that I, THOMAS HANSBROW, of Sacramento, in the county of Sacramento and State of California, have invented a new and useful Improvement in Pumps; and I do hereby declare that the following is a full, clear, and exact description of the same, reference being had to the accompanying drawings, making a part of this specification, in which—

Figure 1:
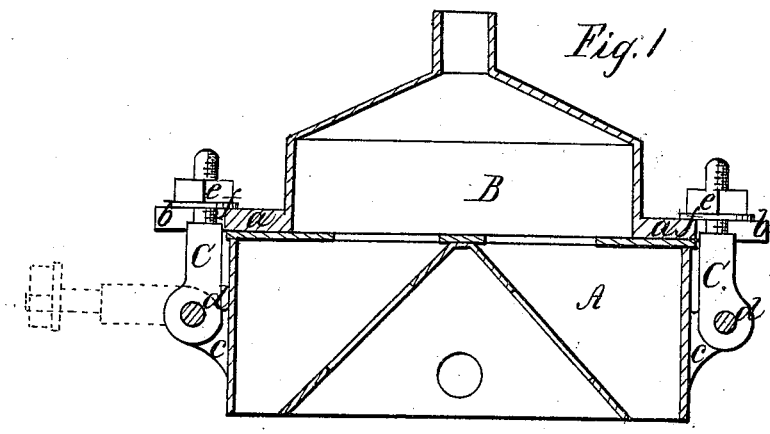
Figure 2:
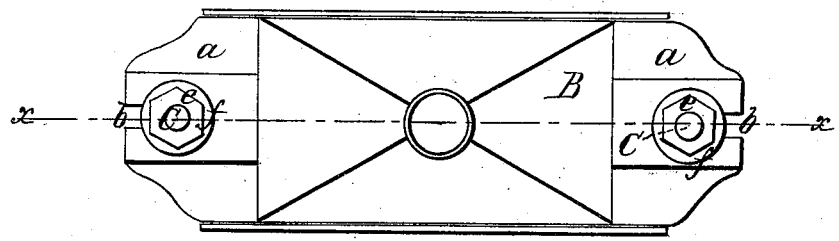
Figure 3:
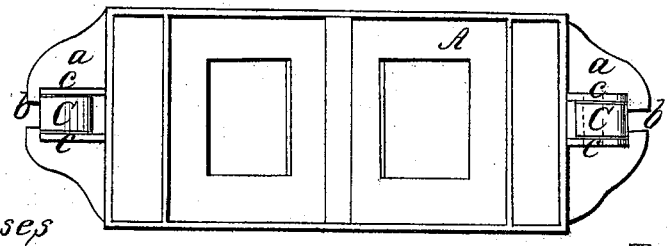

Figure 1 is a vertical central section of my invention, taken in line $x\ x$, Fig. 2; Fig. 2, a plan or top view of the same; Fig. 3, an inverted plan of the same.

Similar letters of reference indicate corresponding parts in the several figures.

This invention relates to an improvement in a pump for which Letters Patent were granted to me bearing date February 5, 1861.

The within-described invention relates to an improved mode of securing the air-chamber to the valve-chest of the pump aforesaid, as hereinafter fully shown and described, whereby a firm and durable connection of the above-named parts is obtained, and one which will admit of being manipulated with the greatest facility in order to secure the air-chamber to the valve-chest and to detach it therefrom.

To enable those skilled in the art to fully understand and construct my invention, I will proceed to describe it.

A represents the valve chest of the pump, and B the air-chamber. These parts, as well as others pertaining to the operating mechanism of the pump, are precisely the same as shown and described in my Letters Patent previously alluded to. The air-chamber B is provided at each end of its lower part with a horizontal projecting plate, $a$, said plates each having a slot, $b$, made longitudinally in it, and extending inward toward the air-chamber a suitable distance. The valve-chest A is provided at each end with two lugs or ears, $c\ c$, between which the lower ends of screw-bolts C are secured by pivots $d$. The screw-bolts C are allowed to turn freely on these pivots $d$, and the slots $b$ in the plates $a$ of the air-chamber are in line with the lugs or ears $c\ c$, so that the bolts $d$ may be fitted in them and the plates $a\ a$, and consequently the air-chamber B be firmly secured down on the valve chest by screwing down the nuts $e$ on the bolts C, said nuts bearing on washers $f$, which are placed on the bolts and rest on the plates $a\ a$ of the air-chamber. (See Figs. 1 and 2.)

In order to detach the air-chamber from the valve-chest, all that is required is simply to unscrew the nuts $e$ and throw out the screw-bolts C as shown in red in Fig. 1. By this arrangement an exceedingly simple means is obtained for securing the air chamber to the valve-chest, and one far preferable to the yokes and set-screws previously used by me.

Having thus described my invention, what I claim as new, and desire to secure by Letters Patent, is—

The combination of the swinging screw-bolts C and slotted plates $a$ with the valve-chest A and air chamber B, in the manner herein shown and described.

THOS. HANSBROW.

Witnesses:
M. M. LIVINGSTON,
M. S. PARTRIDGE.